US006582648B1

(12) United States Patent
Reif

(10) Patent No.: US 6,582,648 B1
(45) Date of Patent: Jun. 24, 2003

(54) METHOD FOR MANUFACTURING MOULDED BODIES FROM CRUSHED MATERIAL AND A BINDER HARDENABLE BY ELECTRON RADIATION

(75) Inventor: Georg Reif, Vienna (AT)

(73) Assignee: Fritz Egger GmbH & Co., St. Johann in Tirol (AT)

( * ) Notice: Subject to any disclaimer, the term of this patent is extended or adjusted under 35 U.S.C. 154(b) by 0 days.

(21) Appl. No.: 09/486,792

(22) PCT Filed: Sep. 2, 1998

(86) PCT No.: PCT/EP98/05562

§ 371 (c)(1), (2), (4) Date: May 17, 2000

(87) PCT Pub. No.: WO99/12711

PCT Pub. Date: Mar. 18, 1999

(30) Foreign Application Priority Data

Sep. 5, 1997 (DE) ........................................ 197 38 953

(51) Int. Cl.[7] .......................... B29B 11/12; B29C 71/04

(52) U.S. Cl. ....................... 264/461; 264/405; 264/460; 264/463; 264/485; 264/488; 264/109

(58) Field of Search ................................ 264/109, 461, 264/405, 460, 463, 485, 488; 425/321, 335, 373, 371, 405.1

(56) References Cited

U.S. PATENT DOCUMENTS

| | | | | | |
|---|---|---|---|---|---|
| 3,549,509 | A | * | 12/1970 | Casalina | 264/128 |
| 3,660,223 | A | * | 5/1972 | Casalina | 264/128 |
| 3,676,283 | A | * | 7/1972 | Kehr et al. | 156/275.5 |
| 4,382,847 | A | * | 5/1983 | Akesson et al. | 264/109 |
| 5,167,978 | A | * | 12/1992 | Gersbeck | 100/153 |
| 5,830,305 | A | * | 11/1998 | Andersen et al. | 156/242 |
| 5,856,022 | A | * | 1/1999 | McCormick et al. | 428/500 |

* cited by examiner

*Primary Examiner*—Stephen J. Lechert, Jr.
(74) *Attorney, Agent, or Firm*—Michael J. Striker

(57) ABSTRACT

A particle board, a fiberboard or an oriented strand board (25) is formed by the process according to the invention from a mixture of a comminuted cellulose material and a binder, especially a synthetic resin containing an unsaturated oligimer, that is hardenable by electron radiation. The process of the invention includes first forming a loosely scattered layer (4) of the mixture, e.g. on a conveyor belt, then compressing the layer in a press device (16), after performing a pre-compression in a pre-press in Some embodiments, and rapid setting of the layer (4) by means of electron radiation from an electron radiation device (22). Unlike the known processes that only use a thermosetting binder, the inventive method is hindered neither by heat transfer to the center of the board nor by a non-uniform humidity profile. High quality boards may be produced at a high yield without splitting and these boards require no conditioning storage.

26 Claims, 5 Drawing Sheets

METHOD FOR MANUFACTURING MOULDED BODIES FROM CRUSHED MATERIAL AND A BINDER HARDENABLE BY ELECTRON RADIATION

BACKGROUND OF THE INVENTION

The invention relates to a process for the manufacture of moulded bodies from comminuted, especially cellulosic material, in particular the manufacture of chipboard, fibreboard or OSB (oriented strand board), in which the prepared material is mixed with a hardenable binder, the mixture being brought to a moulding station, and compressed by way of pressure into a moulded body, whereupon the binder is hardened.

Such a process is generally known, and is utilized for the manufacture of chipboard or fibreboard, generally speaking. Therein utilized are thermally hardenable binders such as urea-formaldehyde resin, melamine-formaldehyde resin, isocyanate, phenol-formaldehyde resin, among others. From the chemical point of view, the hardening corresponds to a thermally accelerated polymerization or polycondensation reaction. In the manufacture of chipboard, the dried and binder-coated chips are led to large format staged presses or cycling presses (discontinuous manufacture), or undergo a continuous process (continuous manufacture), for example, according to the Conti-Roll-process, wherein an endless bed of chips passes along a pressure pathway between gradually converging conveyor belt reaches and/or a roller nip, by which the compression is attained.

Production quantities of such installations are decidedly limited by the comparatively slow hardening procedure. The limiting factor is in particular the passage of the heat from outside to the middle of the panel. To achieve acceleration, the so called "steam impact effect" is used. According to the latter, steam passes by condensation from the hot surface of the panel to the panel centre, and accelerates the transfer of heat. This acceleration however has physical limits, since in the interior of the panel, the steam pressure will adjust itself depending upon the pressure at the exterior, and on the temperature. When, at the end of the compression process, the pressure from the exterior diminishes, the steam pressure within the panel can be too high, resulting in a bursting of the panel, specifically an explosion of the panel at its interior.

An important capacity indicator for a chip panel or a fibre panel production installation is the press factor, which refers to the time required for the panel to harden in the dimension perpendicular to the panel surface. The panel thickness is a factor on the basis of which one can calculate the maximum possible forward feed (in the case of continuous manufacture) or the maximum possible cycles per unit time in the case of a cyclical press, which allows the capacity of the installation to be determined. Typical press factors are in the region of 3 to 6 s/mm for Conti-Roll-installations, and between 5 and 9 s/mm for cyclical installations. As an example, the hardening of a 19 mm panel with a press factor of 5 s/mm results in a manufacturing time of 95 seconds.

The steam impact effect, which is advantageous for the acceleration of the hardening, has the further disadvantage that the product moisture at the surface of the panel is practically nil, and significantly climbs toward the interior, producing an inhomogeneous moisture profile. From the point of view of a stable product, however, a homogeneous moisture profile is important to strive for, since this is reached, in practice, only after storage lasting several weeks. The working and particularly the cashiering of panels with significantly inhomogeneous moisture profiles leads to problems of quality. Further, continuously rising installation outputs have led to a lower product moisture content, which is now below the moisture content of the product in its typical use (uniform moisture). The product thus endeavours to remove moisture from its surroundings.

The use of high-energy electron radiation (gamma radiation, roentgen radiation, ionizing radiation) for the hardening of organic synthetic resin is already known. Described in AT 338499 is the impregnation of chipboard and fibre board with radiation-hardenable components in order to attain specified technological characteristics. In this reference, panel material is manufactured in a hot press procedure according to the standard process. Following this, in the alternating pressure process, is an impregnation with the irradiation-hardenable components, and their hardening utilizing electron radiation energy. With this subsequent treatment, the expectation is that the mechanical characteristics of the panel and its dimensional stability in the presence of water will be improved, so that the actual manufacture of the panel can be carried out with a significantly reduced amount of thermally hardenable binder. One radiation-hardenable binder is a mixture of unsaturated oligomers (at least 30% by weight), acrylonitrile (1–30% by weight), unpolymerized additional materials (maximum 30% by weight) and the rest up to 100% by weight of vinylic unsaturated monomers. Examples of unsaturated monomers are: polyester resins, acrylic resins, diallylphthalate-prepolymerisate, or an acryl-modified alkyd resin, epoxy resin or urethane resin. Additional material may include polymerisation-accelerators.

In this case it is not a matter of manufacturing a panel by way of electron bombardment, but rather a subsequent refinement in a downstream process, utilizing electron bombardment for the improvement of the panel characteristics. The actual manufacture of the panel takes place, here as well, through the use of a thermally hardenable binder as well as the application of heat in the press region, with a complete hardening of the binder contained in the compressed panel. As such, the previously mentioned disadvantages—a limitation in capacity due to the time necessary for heat transfer, an inhomogeneous dampness profile and the danger of the panel exploding—are basically not avoided.

From U.S Pat. No. 3,549,509 it is known to manufacture a moulded body by the use of radiation-hardenable binder material. In this process, wood dust or sawdust is mixed with a radiation-hardenable liquid monomer, placed into a mold, therein compressed, and hardened by the operation of radiation energy. The source of the radiation can be radioactive electron emitters (for example cobalt-60) or ionizing radiation sources (for example x-rays). In accordance with these examples, the hardening takes place in a cobalt-60 radiation chamber. Methylacrylate; methylmethacrylate and propylacrylate are suggested as radiation-hardenable monomers.

The hardening in a closed mold (radiation chamber) and the comparatively slow hardening of monomers subjected to gamma radiation both interfere with attaining a high manufacturing capacity. Accordingly, this known process is also not to be recommended for the manufacture of comparatively thick plates or bodies moulded from chips or fibres, but rather only for thin coatings on products already of stable shape which are first deposited in the mold.

SUMMARY OF THE INVENTION

It is an object of the invention to carry out the manufacturing process so that an increased production capacity is possible, without having to deal with a problematical moisture content, or an inhomogeneous moisture distribution.

This object is attained by way of the originally described process which, in accordance with the invention, is characterized in that the material is mixed with a binder which is hardenable by electron beam energy, and in that after compression, the binder is hardened by electron radiation.

The invention is based on the fact that the activation and hardening of the binder material, contrary to thermally hardended binders, are caused by high energy radiation from an electron beam accelerator. The capacity thereof is essentially determined by two values: the accelerator voltage in MeV, which is responsible for the wide field of the energy within the irradiated body, and the energy quantity (beam capacity, dose) directed from the irradiator to the irradiated body, which is the product of the accelerator voltage times the accelerator current. The beam capacity determines the quantity of energy transferred to the body and absorbed therein, said absorbed energy quantity being responsible for the hardening of the binder. Available accelerator systems with an accelerator voltage of 10 MeV make possible a unilateral radiation of a flat work material, which for example has a specific weight of 750 kg/m$^3$, a penetration depth of about 40 mm, and with bilateral irradiation with 10 MeV on each side, the penetration depth is about 105 mm.

Compared with the typical manufacturing process for chipboard or fibreboard, the process in accordance with the invention offers important advantages. The polymerisation of binders, especially containing oligomers, is an uneven process and is determined primarily by the delivery of the required polymerisation energy (irradiation dose in kGy). Hardening takes place within a few tenths of a second. This makes possible press factors of 0.05 s/mm, so that for the already mentioned 19 mm plate, a hardening time of about 1 second is required, whereas with the conventional heat-hardening, 95 seconds is required.

While water, in the conventional thermal hardening, has the advantage of heat transfer into the middle of the panel, and with a decrease in pressure has the disadvantage of the danger of bursting, it has hardly any influence on the process, according to the invention. No danger of moisture transfer arises, because no unilateral thermal loading is applied to the product, this being responsible for the moisture migration within the product to the cold middle region of the panel. In the product itself neither the absorption of incident radiation nor polymerisation gives rise to any vertical temperature increase, which would make possible the generation of significant steam pressure. Accordingly, the danger of the panel bursting is not present. Maturation periods of several days, necessary for the conventional manufacturing process, are therefore not required, this being an advantage in view of the large installation space required and the expenditure of capital in connection therewith.

Unsaturated oligomers are suitable as a binder for the electron irradiation hardening. It can be of advantage to mix these monomers together in order to influence the kind and grade of the polymerisation of the binder. Such monomers are also referred to as cross-polymerisers. Cross-polymerisers have available mono (for example HDDA), di-(DPGDA), tri-(for example TMPTA) or polyfunctional groups. The selection of the cross-polymerizer in coordination with the unsaturated oligomer and with reference to the mixture ratio and with a combination of various cross-polymerizers influences the characteristics of the manufactured molded body or panel, for example resistance to bending, resistance to transverse stress, E-bending modulus, and capacity to withstand air-borne moisture and water)

For the investigated oligomers and mixtures of oligomers with cross-polymerisers, a radiation dose between 70 and 100 kGy is necessary in order to achieve complete hardening. Suitable unsaturated oligomers are, for example, polyester resin, acrylic resin, diallylphthalat-preliminary polymerisate, acryl-modified alkyd resin, epoxy resin or urethane resin. These are, in contrast to the conventionally utilized condensation resins, free of formaldehyde (test according to DIN EN 120 with photometric evaluation) and make possible a bonded material which resists boiling water under the terms of EN 1087-Part 1.

It is already part of the conventional manufacture utilizing thermal hardening to try to accomplish or at least initiate the hardening itself at the point of the greatest compression of the molded body or panel, so that the body stability or dimensional stability is ensured, and no spring-back results from the release of the pressure. In the process of electron beam hardening the rapid hardening procedure is of advantage. By contrast, the application of radiant energy in the high pressure region is impractical, to the extent that the mechanical loading of correspondingly thick panels or other pressure absorbing apparatus is present which to a large extent acts as a radiation absorber and reduces the penetration depth of the radiation. In this connection it was determined that, in order to ensure the maximum material compression prior to hardening, it was sufficient to provide a holding pressure which lay significantly below the (maximum) pressure. Consequently it is of advantage to carry out the hardening at a corresponding low holding pressure outside of the electron radiation-weakening press apparatus, thus for example spaced behind the narrowest press gap for the Conti-Roll-process.

Under similar considerations, one of the advantageous possibilities lies in the use of increased pressure with a corresponding over-compression, so that the unhardened moulded body or panel, after passing through the press apparatus, springs back to the desired nominal thickness. Then, in order to achieve hardening, a fully unhindered radiation with electron energy can be carried out not only from the press apparatus but also from the holding apparatus.

In order to achieve an unhindered and unweakened irradiation with electron energy the process can be in two steps:

a first stabilizing partial hardening with heat and pressure, and a subsequent electron-beam hardening without external pressure loading. Of course, this would require the use of a binder containing a binder portion which hardens under the application of heat. For this procedure, a mixture of commonly utilized thermally hardenable binders can be used.

As a variant, it is possible, for a thermal part-hardening or first hardening, to utilize an addition of an organic peroxide (for example TBPEH), which is introduced together with the binder, so that the influence of temperature initiates the cross-linking of the binder. Here as well there occurs a two-stage hardening, in which at a first stage the application of pressure and heat produces a first hardening or partial hardening while stabilizing the compressed material, and at a second stage, in the absence of externally applied pressure, the complete hardening or polymerisation of the binder is achieved through electron beam energy. The thermal first hardening, in this case, also serves merely to fix the material in the compressed state and can take place at a comparatively lower temperature, so that the previously mentioned technological disadvantages of thermal hardening can be kept within limits.

A further variant of the thermal part-hardening involves the hardening of only the surface layer, under pressure and temperature. The surface layer thus hardened can have a thickness from one mm to several mm. The binder in this surface layer can consist of a binder which is not hardenable in the electron beam, a mixture of a thermally hardenable binder and a binder hardenable in the electron beam, or a mixture consisting of a binder hardenable in the electron beam and an organic peroxide. The binder for the portion of the product aside from the surface layer can be a binder which is hardenable in an electron beam, or a mixture of a thermally hardenable portion and a further portion hardenable in the electron beam.

The thermal hardening of the surface layer must not lead to a complete cross-linking of the binder, particularly when the utilized binder contains a portion which is hardenable in the electron beam. Instead, one should strive to keep as short as possible the thermal effect on the surface layer, in order to maintain as small as possible the expected disadvantageous panel characteristics arising because of the effect of temperature. Downstream of the thermal partial hardening there occurs a final hardening of the product by the effect of electron beam energy, in which the latter can occur, depending on the requirement for product characteristics, selectively under the effect of a holding pressure already minimized by thermal hardening compared to the first stage, or without any pressure.

The already partially hardened surface layer simplifies the application of a holding pressure in the sense that no stabilizing belt, or apparatus that is similar thereto in function and effect, is required in the region of the electron beam application, or at the very least the belt can be significantly reduced in size, whereby there occurs no or a very reduced absorption of the electron beam energy in the belt or in the apparatus, thus making possible an improved utilization of the electron beam energy in the product. Incidentally, during the two-stage hardening, the effect of temperature favours certain surface layer properties of the product (coating/painting capability, attainable density and density distribution).

The process in accordance with the invention is particularly suitable for the manufacture of chipboard, fibreboard or OSB. However it can also be used with other cellulosic or similar material available in particles or pieces, wherein bonding takes place on the opposite side by way of a binder. Examples are: the manufacture of plywood panels, panel-shaped items made from paper or paper pulp, textile fibres, bark and/or specific refuse fractions such as waste plastic or compound materials made of plastic and paper or cardboard.

The invention is directed to an apparatus particularly for the continuous manufacture of panel-like bodies, especially chipboard and fibreboard, with a distribution device, a conveyor belt and a press apparatus, these being generally known for the manufacture of chipboard and fibreboard. In accordance with this invention, the apparatus is characterized in that the press apparatus is followed, in the conveying direction, by an electron radiation apparatus.

Suitable arrangements and developments of this apparatus appear in the sub-claims.

With such an apparatus in accordance with the invention the inventive process can be carried out, so that the above-named advantages of the process apply also to the inventive apparatus.

The following examples 1 through 5 are attempts to provide evidence of the improved mechanical-technical characteristics of chipboard which has been hardened with electron beam energy in accordance with the invention:

EXAMPLE 1

In order to study the supplementary step of the proposed radical hardening using organic peroxide, 100 parts of surface layer chips from an industrial chip dryer were mixed together in a stirring apparatus with 20 parts of binder (urethane acrylate) and 0.7 parts of organic peroxide (TBPEH), and then subsequently placed in a laboratory press (format 33×33 cm) at 150° C. for 10 minutes and under a specific pressure of 13 $N/mm^2$. The mechanical-technological characteristics were as follows:

| Test | Density [$kg/m^3$] | Thickness [mm] | Hardened resin, bone dry [%] | Transverse strength [$N/mm^2$] | Residual moisture [%] | Peroxide |
|---|---|---|---|---|---|---|
| 1019/20 | 1006 | 316 | 20.8 | 1.5 | 4.0 | TBPEH |

EXAMPLE 2

To 100 parts of industrially dried mid-layer chips were added, in a gluing drum using air commutation, 10 parts of binder (urethane acrylate) and 0.4 parts of organic peroxide (TBPEH). In a laboratory press, panels in the format of 40×40 cm were made at 150° C. for 5 minutes, at specific pressure of 10 $N/mm^2$. The result of the manufacture was a uniform panel thickness. In a similar manner, comparable panels were manufactured with a UF-resin as binder (test series A). The mechanical-technological characteristics were as follows:

| Test | Density [$kg/m^3$] | Thickness [mm] | Hardened resin, bone dry [%] | Transverse strength [$N/mm^2$] | Residual moisture [%] | Peroxide or binder |
|---|---|---|---|---|---|---|
| 1019/21 | 676 | 15.6 | 10.4 | 0.68 | 4.0 | TBPEH |
| A | 680 | 16.0 | 11.0 | 0.60 | 5.5 | UF |

Both panels yielded comparable results in regard to transverse strength.

The test-pieces of the subsequent examples 3 to 5 are round probes with a diameter of about 110 mm. They were hardened in an electron particle accelerator apparatus with an acceleration voltage of 10 MeV and a current of about 1.5 mA corresponding to a mid-range beam capacity of 15 kW.

EXAMPLE 3

Industrially dried mid-region chips were comminuted prior to further working, and the fraction passing a sieve with an aperture measuring from 2 to 4 mm was utilized. 100 paRT of chips were binder-coated in a laboratory coating drum with 10 parts of binder (epoxy acrylate) and one part of a crosslink-promoter (HDDA, TMPTH, DPGDA) corresponding to the test series K, L and M). The coating was done hot, at roughly 80° C. binder temperature, utilizing dispersion through a two-substance nozzle. The chip moisture was about 4%, based on the dry mass. The coated chip material was pressed into rings and hardened by an electron beam at a dose (determined on the outer surface of the test probe) of about 110 kGy. Comparable test bodies were manufactured in a similar manner with urea-formaldehyde binder (UF) (100 parts chips, 10 parts solid resin, ammonium sulphate as the hardening component corresponding to the test series J). The mechanical-technological characteristics were as follows:

| Test | Tranverse Force normalized at 450 kg/m$^3$ [N/mm$^2$] | Boiling point transverse force [N/mm$^2$] | 2-hour Swelling [%] | 24-hour Swelling [%] | Density [kg/m$^3$] | Solid resin bone dry [%] | Formaldehyde [mg/100 g] | Remaining moisture [%] | Crosslink Promotor Binder |
|---|---|---|---|---|---|---|---|---|---|
| K1/2 | 0.317 | 0.101 | 5.1 | 8.8 | 409 | 11.0 | <0.5 | 10.0 | TMPTA |
| | | 0.131 | 4.6 | 8.7 | 429 | 11.0 | <0.5 | 10.0 | TMPTA |
| L1/2 | 0.344 | 0.120 | 3.6 | 9.6 | 448 | 11.0 | <0.5 | 10.0 | DPGDA |
| | | 0.173 | 3.2 | 8.8 | 451 | 11.0 | <0.5 | 10.0 | DPGDA |
| M1/2 | 0.319 | 0.130 | 3.2 | 8.8 | 445 | 11.1 | <0.5 | 10.0 | HDDA |
| | | 0.136 | 3.1 | 10.4 | 462 | 11.1 | <0.5 | 10.0 | HDDA |
| J1/2 | 0.292 | — | 9.6 | 15.0 | 457 | 10.8 | 5.7 | 6.0 | UF |

In a comparison to the test probes hardened by an electron beam, it can be seen that, at the same coating level, the transverse strength is greater, the test probes exhibit a boiling point transverse strength, and the 2 hour swelling is decreased. It is to be noted that the urea-formaldehyde binder could not be tested for the boiling point transverse strength (because the probe dissolved when exposed to the heat). The formaldehyde content of the radiation hardened probes lay below the limit of detection of 0.5 mg per 100 g panel, according to EN 120.

EXAMPLE 4

The probes were manufactured in the same manner as described in example 3, however the degree of coating was reduced by about 50%. The mechanical-technological characteristics were as follows:

| Test | Tranverse Force normalized at 450 kg/m$^3$ [N/mm$^2$] | Boiling point transverse force [N/mm$^2$] | 2-hour Swelling [%] | 24-hour Swelling [%] | Density [kg/m$^3$] | Solid resin bone dry [%] | Formal dehyde [mg/100 g] | Remaining moisture [%] | Crosslink Promotor |
|---|---|---|---|---|---|---|---|---|---|
| N1/2 | 0.265 | 0.076 | 6.3 | 11.3 | 428 | 5.5 | <0.5 | 10.0 | TMPTA |
| | | 0.118 | 9.6 | 15.0 | 477 | 5.5 | <0.5 | 10.0 | TMPTA |
| O1/2 | 0.265 | 0.074 | 10.0 | 12.2 | 462 | 5.6 | <0.5 | 10.0 | DPGDA |
| | | 0.077 | 8.1 | 11.6 | 436 | 5.6 | <0.5 | 10.0 | DPGDA |
| P1/2 | 0.291 | 0.085 | 6.8 | 12.6 | 466 | 5.5 | <0.5 | 10.0 | HDDA |
| | | 0.075 | 5.8 | 10.8 | 418 | 5.5 | <0.5 | 10.0 | HDDA |
| J1/2 | 0.292 | — | 9.6 | 15.0 | 457 | 10.8 | 5.7 | 6.0 | UF |

In comparing the probes hardened by the electron beam it is noted that if the coating degree is definitely less, the transverse strength decreases to as much as 9.3%. The boiling point transverse strength is nonetheless present and is about 50% smaller than the value in example 3. The formaldehyde content of the irradiation-hardened probes lay below the limit of detection of 0.5 mg per 100 g of panel according to EN 120.

EXAMPLE 5

By comparison with examples 3 and 4, the binder in this case was in the form of a 25% emulsion (for improved distribution) of a melamine acrylate in cold condition. The water introduced by the emulsion greatly increased the chip moisture in the coated condition. In the conventional manufacturing process with the commonly utilized binders, panels with such a chip moisture can be manufactured only at a definitely decreased press temperature, and with a longer pressing time.

The mechanical-technological characteristics were as follows:

| Test | Tranverse Force normalized at 450 kg/m$^3$ [N/mm$^2$] | Boiling point transverse force [N/mm$^2$] | 2-hour Swelling [%] | 24-hour Swelling [%] | Density [kg/m$^3$] | Solid resin bone dry [%] | Formaldehyde [mg/100 g] | Remaining moisture [%] | Binder |
|---|---|---|---|---|---|---|---|---|---|
| R1/2 | 0.277 | 0.091 | 3.0 | 8.4 | 494 | 4.8 | <0.5 | 20.8 | Emulsion |
| | | 0.086 | 3.0 | 8.6 | 470 | 4.8 | <0.5 | 20.8 | Emulsion |
| J1/2 | 0.292 | — | 9.6 | 15.0 | 457 | 10.8 | 5.7 | 6.0 | UF |

Despite a high degree of residual panel moisture and a low degree of coating, the transverse strength for R is comparable with UF-bonded probe bodies and lies in the same region as the probes in example 4. For the series R, the small 2-hour swelling is striking.

BRIEF DESCRIPTION OF THE SEVERAL VIEWS OF THE DRAWING

Example embodiments of the apparatus according to the invention will be more fully described below with reference to schematic drawings, which show.

DETAILED DESCRIPTION OF THE INVENTION

Figure 1:
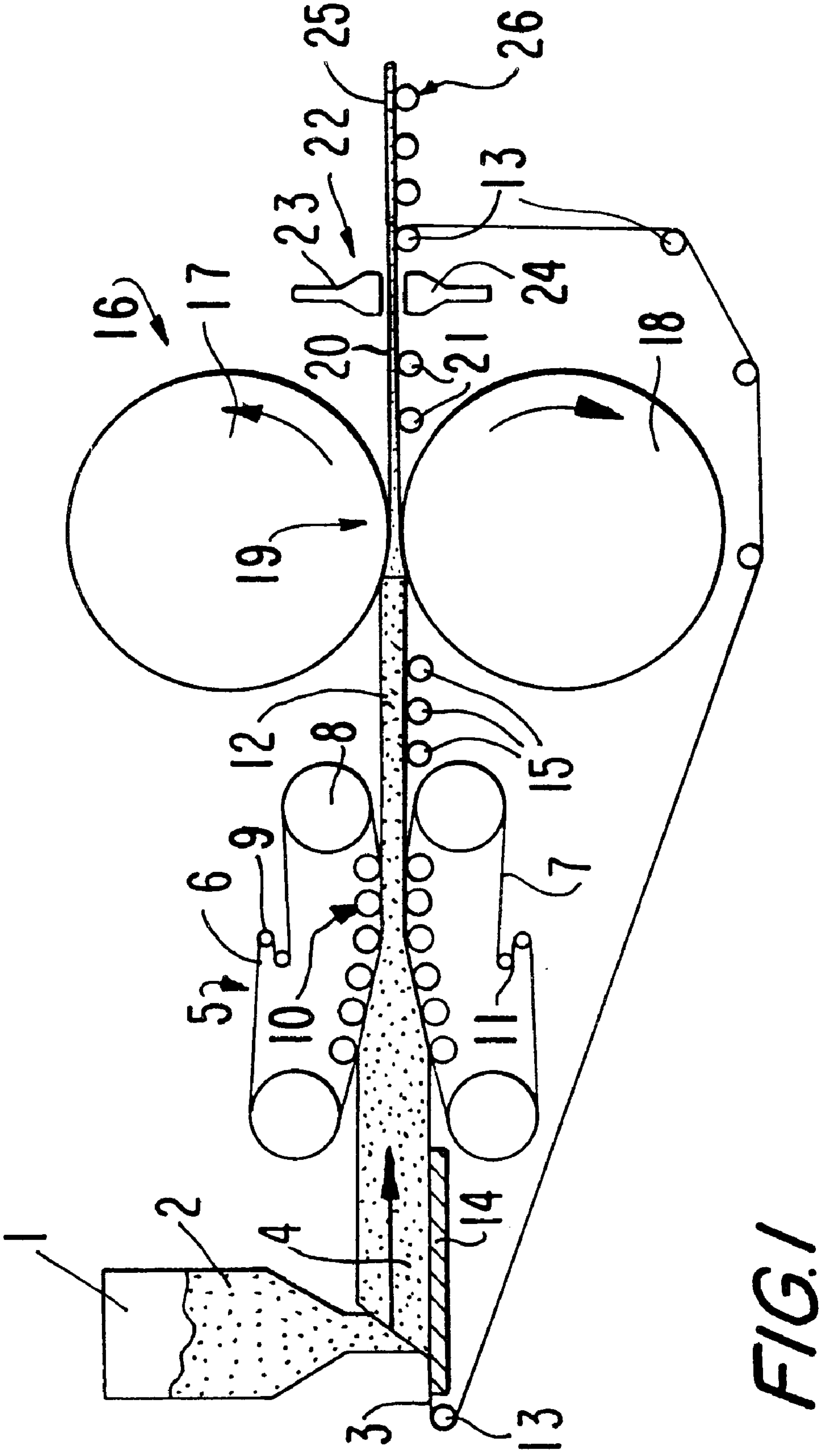
In FIG. 1 an apparatus for the continuous manufacture of chipboard or fibreboard by utilizing a prepress, with bilateral electron irradiation.

In accordance with FIG. 1 there is provided a container-shaped scattering device 1, containing cellulosic material 2 (wood chips, wood fibres) coated with a binder material hardenable by electron irradiation. This material 2 is uniformly distributed on a continuously circulating belt 3, upon which a loose scattered layer 4 accumulates. The latter is pre-compressed in a prepress 5.

The prepress 5 includes, in mirror-symmetrical construction and arrangement, an upper pre-compression belt 6 and a lower pre-compression belt 7, which are led around reversing rollers 8, tension rollers 9, upper pre-pressure rollers 10 and lower pre-pressure rollers 11. The conveyor belt 3 with the scattered layer 4 runs between the pre-compression belts 6 and 7 which gradually approach each other in the transport direction, this being attained due to the ever decreasing spacing, in the transport direction, between pairs of opposed pre-pressure rollers 10 and 11. This produces, from the scattered layer 4, a thinner pre-compressed layer 12.

The conveyor belt 3 is entrained about reversal rollers 13, and runs over a rigid table 14 in the area where the material 2 is dispensed, and also runs over support rollers 15 downstream of the pre-press 5. Downstream of the pre-press 5 is a press apparatus 16 (main press) which includes an upper drum 17 and a lower drum 18, defining a pressure nip 19 through which the upper reach of the conveyor belt 3 passes along with the pre-compressed layer 12, thus producing the compressed layer 20, which passes along with the conveyor belt 3 over the support rollers 21. The compressed layer 20, due to spring-back, has a somewhat greater thickness than that matching the specific size of the pressure nip 19.

Thereafter, the conveyor belt 3 passes, with the compressed layer 20, through an electron bombardment device 22, which includes an upper electron beam accelerator 23 and a lower electron beam accelerator 24, which are directed toward each other. Because of the sudden hardening of the binder mixed with the material 2, due to the electron bombardment, there emerges from the electron bombardment device 22, and from the compressed layer 20, a hardened panel 25 (endless panel), which is led away over support rollers 26 to appropriate final treatments (rectangular trimming, surface grinding).

Figure 2:
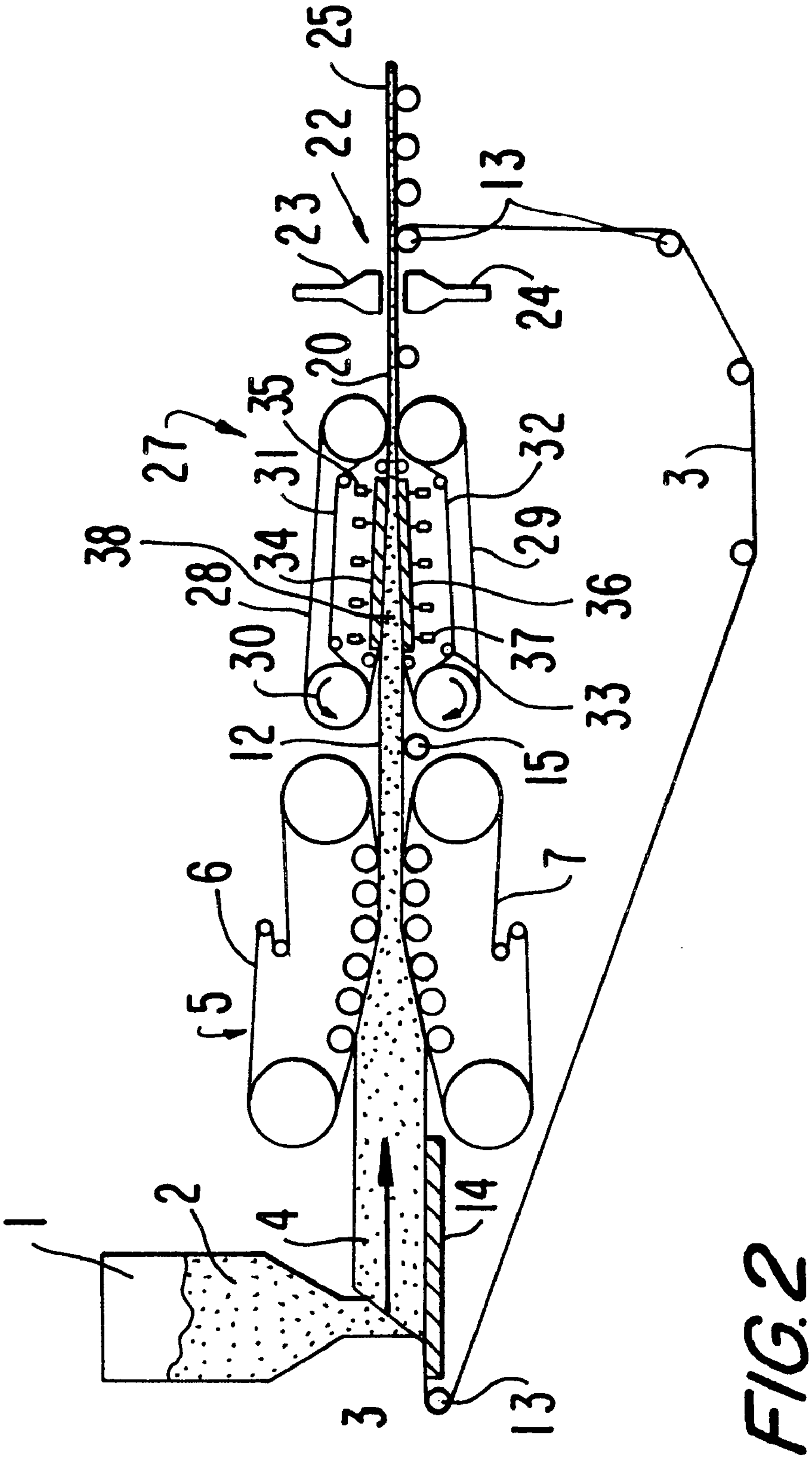
In FIG. 2 an apparatus as in FIG. 1, in which the main press is differently configured.

The apparatus according to FIG. 2 is largely identical to that described above. In view of the similarities, and this applies also to the subsequent figures, like reference numerals will be utilized without repeating again the same description. The difference with respect to FIG. 1 is that, instead of the pressure apparatus 16, there is provided a convergingly arranged press apparatus 27. This press apparatus 27 is constructed to operate according to the Conti-Roll-process, but can be substantially shorter than is usually the case with processes utilizing thermal hardening.

The press apparatus 27 includes an upper belt 28 and a lower belt 29, which are trained over reversing rolls 30. Within the upper belt 28 is an endless series of upper roller rods 31, while correspondingly there is, within the lower belt 29 an endless series of lower roller rods 32 wherein the roller rods are trained around corresponding reversing rolls 33. An upper pressure plate 34 is placed adjacent the upper roller rods 31 and has an upper pressure cylinder 35, whereas a pressure plate 36 and a lower pressure cylinder 37 are provided to cooperate with the lower roller rods 32. The pressure plates 34 and 36 are slightly convergent in the conveying direction, so as to provide a gradually decreasing pressure gap 38, through which the conveyor belt 3 and the pre-compressed layer 12 run. Utilizing corresponding pressures of the pressure cylinders 35 and 37, the pressure exerted by the pressure apparatus 27, and thus the compression process, can be adjusted to meet the prevailing requirements and conditions.

Figure 3:
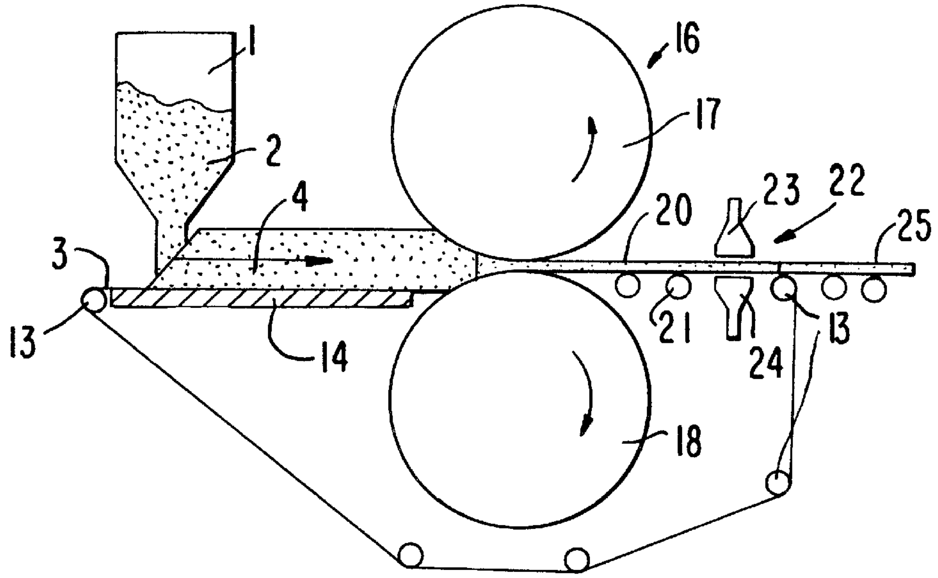
In FIG. 3 an apparatus corresponding to FIG. 1, however without a prepress.

By comparison with FIG. 1, the apparatus according to FIG. 3 lacks the prepress 5. Accordingly, the scatter layer 4 is led directly to the press apparatus 16 and is converted to the compressed layer 20.

Figure 4:
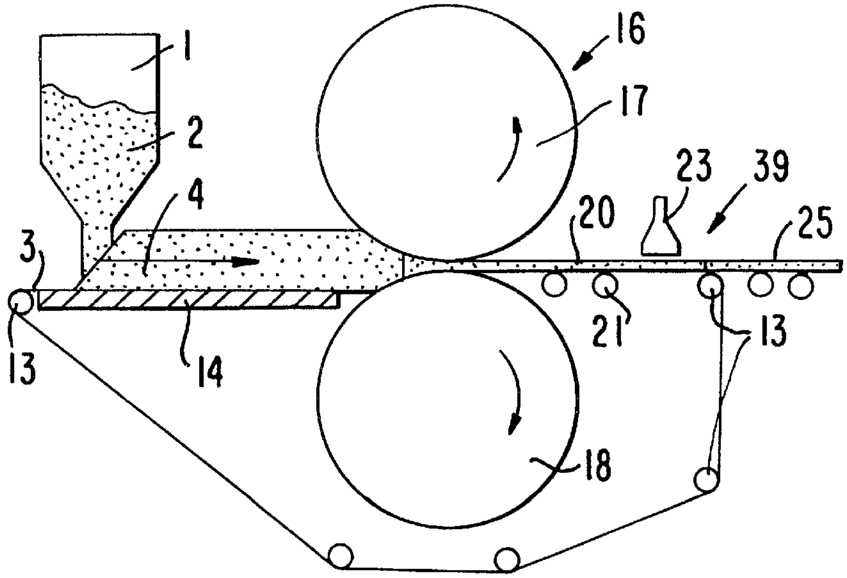
In FIG. 4 an apparatus corresponding to FIG. 3 with a unilateral electron irradiation.

The apparatus according to FIG. 4 differs from that seen in FIG. 3 only that a simplified electron bombardment device 39 is provided, which has only one electron beam accelerator 23, which irradiates the compressed layer 20 only from the upper position. Of course, it is also possible to irradiate exclusively from the lower position.

Figure 5:
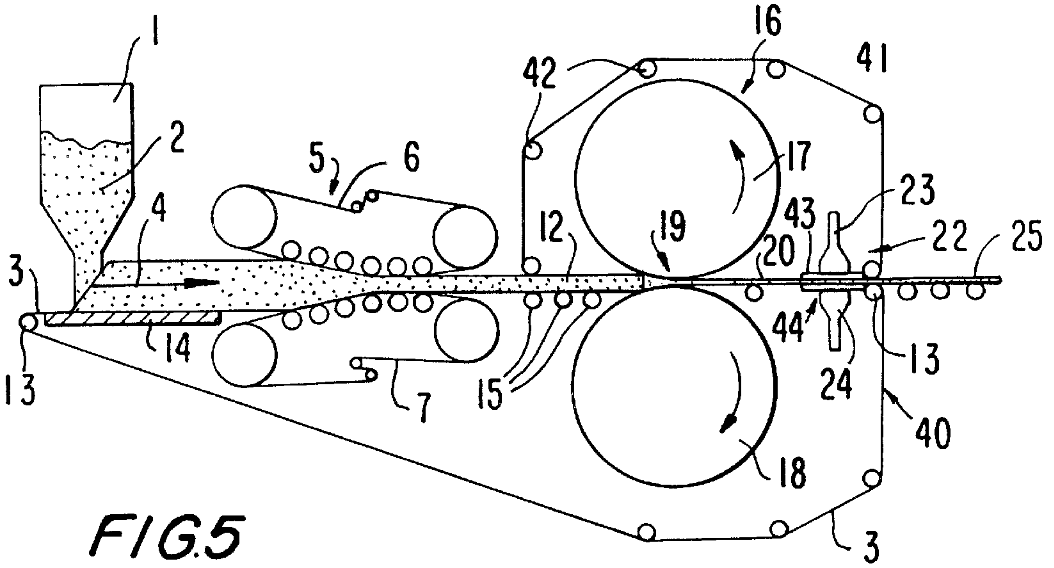
In FIG. 5 an apparatus corresponding to FIG. 1, in which however, in the region of the electron irradiation, a holding pressure is exerted on the compressed panel.

The apparatus according to FIG. 5 is a further development of the apparatus according to FIG. 1, wherein, in the region of the electron bombardment device 22, there is provided a pressure-holding arrangement 40 to which the conveyor belt 3 with the compressed layer 20 passes, the arrangement 40 including two containment conveyor belts, specifically a circulating upper containment conveyor belt 41 trained over rolls 42 which, as illustrated, passes through the press apparatus 16, and a lower containment conveyor belt which here is constituted by the conveyor belt 3.

In the example embodiment according to FIG. 5, there is provided, in the region of the electron bombardment device 22, a holding pressure which is below the pressure of the press apparatus 16. To accomplish this, there is provided a vacuum device 43 for the creation of a vacuum zone 44 extending through the compressed layer 20, so that atmospheric pressure acting from outside the conveyor belts 3 and 41 provides the holding pressure which ensures that the thickness of the compressed layer 20 during electron bombardment corresponds to the pressure nip 19.

Figure 6:
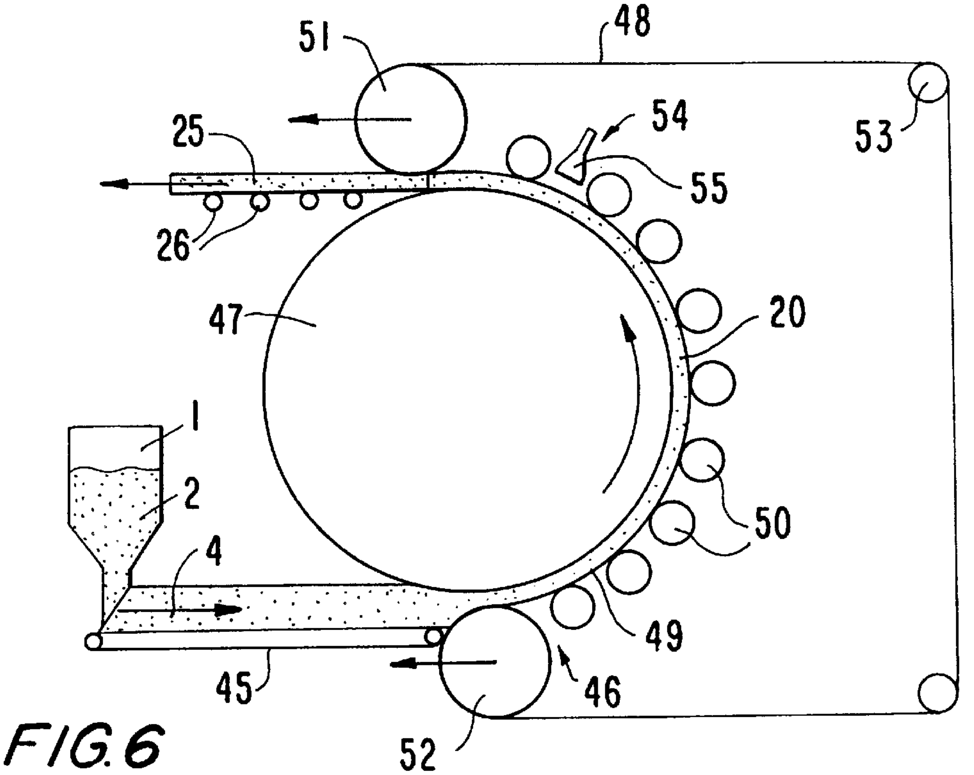
In FIG. 6 an apparatus with a press which consists of a drum of large diameter, pressure rolls working together with the drum and a pressure belt, wherein there is provided a unilaterally operating electron radiation apparatus; and In FIG. 7 an apparatus substantially corresponding to FIG. 2, which serves to bring about hardening by a combination of thermal effect and electron irradiation, wherein the hardened product is transported to a separate unit located downstream from the press apparatus.

In the apparatus according to FIG. 6, the conveyor belt 3 and the table 14 are replaced by a short delivery conveyor belt 45. The latter delivers the scattered layer 4 to a press apparatus 46 which includes a drum 47 of large diameter which is encircled over one-half its periphery by a pressure belt 48 with a radial spacing, thus providing a long pressure gap 49. The pressure belt 48, in the region of the pressure gap 49, is supported on the back side by pressure rollers 50, which exert the compression pressure. The pressure belt 48 runs around an upper reversing pressure roll 51 and a lower reversing pressure roll 52, both of which are arranged adjacent the drum 47, and can be placed under tension by exerting force in the direction of the arrows. The pressure belt also runs around further rollers 53.

At the end of the pressure gap 49 there is provided an electron bombardment device 54 with an electron beam accelerator 55, which is located between the last two pressure rollers 50, taken in the travel direction. In addition, it would be possible to provide an oppositely positioned electron beam accelerator within the drum 47 (not illustrated).

By way of the indicated shifting of the pressure rollers 51 and 52, there is exerted a corresponding tension on the pressure belt 48. The actual compression of the scatter layer 4 takes place, as illustrated, primarily in the region of the lower pressure roll 52, and possibly also in the region of the pressure rolls 50 which are first encountered in the circumferential running direction. Because the pressure belt 48 is held in constant spacing from the drum 47 in the region of the further pressure rolls, the pressure belt 48 in the region of the electron bombardment device 54 exerts only a holding function, in order to prevent spring-back in the compressed layer 20 prior to the hardening in the region of the electron beam accelerator 55. The hardened panel 25 (endless plate) is then led away over the support rollers 26.

Figure 7:
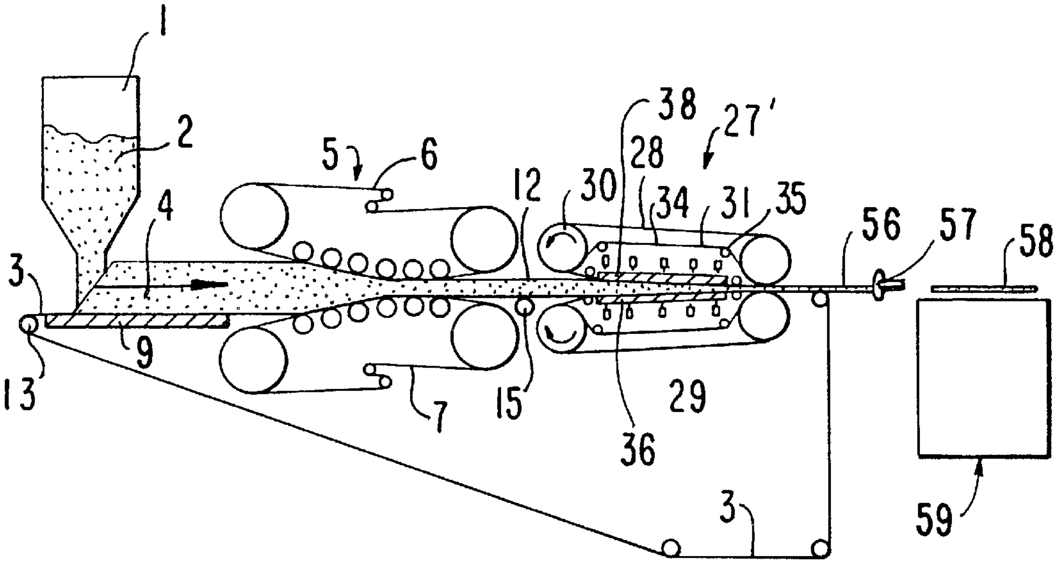
Figure 7:
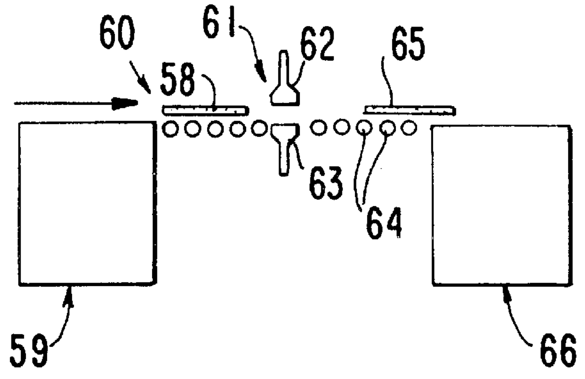

In FIG. 7 there is illustrated an apparatus which is largely the same as that already described with reference to FIG. 2, with a comparatively short press apparatus 27' (Conti-Roll-process). A difference occurs in the layering with a material 2', which is mixed not only with radiation-hardenable binder material, but also with thermally hardenable binder material, sufficient to accomplish a partial hardening (pre-hardening) for shape stabilization. Accordingly, heat is passed through pressure plates 34 and 36 of the press apparatus 27' and causes a partial hardening due to the reaction of only the thermally hardenable binder material. The result is a partially hardened endless panel 56 which, as illustrated, is cut by a diagonal saw 57 into partially hardened individual panels 58, which are stored in an intermediate storage 59, without having been hardened by radiation.

Instead, the radiation hardening takes place in a downstream, separated unit 60 having an electron bombardment device 61 which includes an upper electron beam accelerator 62 and a lower electron beam accelerator 63, between which the partially hardened individual panels 58 are passed, supported on support rolls 64, resulting in fully hardened individual panels 65, in which now also the radiation-hardenable binder has reacted chemically, so that the individual panels 65 achieve their final strength. They may then be stored in a storage unit 66.

In a corresponding arrangement of the electron bombardment device 61, the irradiation hardening can also take place immediately after the press apparatus 27', before or after cutting with a diagonal saw 57 (not illustrated). This arrangement is particularly suitable for the process variation involving a partial thermal hardening of the two surface layers, and an end-hardening of the material utilizing electron radiation energy. The application of holding pressure in the region of the electron irradiation can take place in the manner illustrated in FIG. 5 for the apparatus 40.

What is claimed is:

1. A process for manufacture of chipboard, fibreboard or oriented strand board from comminuted cellulose material, said process comprising the steps of:

a) mixing the comminuted cellulose material with a binder to form a mixture, said mixture containing from 1 to 30 percent by weight of said binder, based on dry mass of said cellulose material, said binder being hardenable by electron radiation;

b) compressing said mixture to form a molded body; and c) after the compressing, hardening said binder by said electron radiation to form the chipboard, fiberboard or oriented strand board from said molded body.

2. The process as defined in claim 1, wherein said compressing occurs so that said mixture is compressed beyond a nominal compression and springs back so as to have a nominal thickness and said hardening by said electron radiation takes place while said mixture is not under external pressure.

3. The process as defined in claim 1, wherein said hardening by said electron radiation takes place while said mixture is under a holding pressure that prevents spring back of said mixture.

4. The process as defined in claim 1, wherein said binder comprises a synthetic resin, said synthetic resin comprises an unsaturated oligomer, said unsaturated oligomer has polymerizable carbon-carbon double bonds and further comprising including in said mixture from 1 to 20 percent by weight, based on said dry mass of said cellulose material, of a monomer for accelerating said hardening.

5. The process as defined in claim 4, wherein said unsaturated oligomer is selected from the group consisting of unsaturated polyester resins, ether acrylate resins, epoxide acrylate resins, urethane acrylate resins and unsaturated acrylate resins.

6. The process as defined in claim 4, wherein said monomer is included in said mixture an amount of from 1 to 5 percent by weight, based on said dry mass of said cellulose material, has a least one functional group and consists of an unsaturated vinyl monomer.

7. A process for manufacture of chipboard, fiberboard or oriented strand board from comminuted cellulose material, said process comprising the steps of:

a) mixing the comminuted cellulose material with a binder hardenable by electron radiation and with a form-stabilizing thermally hardenable binder to form a mixture;

b) compressing said mixture to form a molded body; and c) during the compressing thermally partially hardening said form-stabilizing thermally hardenable binder; and d) after the compressing, additionally hardening said binder hardenable by said electron radiation to form the chipboard, fiberboard or oriented strand board from said molded body hardened by said form-stabilizing hardenable binder.

8. The process as defined in claim 7, wherein only an outer surface region of said mixture is thermally hardened during the thermally partially hardening.

9. The process as defined in claim 7, wherein said mixture contains from 0.5 to 20 percent by weight, based on dry mass of said cellulose material, of said form-stabilizing thermally hardenable binder and from 0.5 to 20 percent by weight, based on said dry mass of said cellulose material, of said binder hardenable by said electron radiation.

10. The process as defined in claim 7, wherein said mixture contains from 1 to 10 percent by weight, based on dry mass of said cellulose material, of said form-stabilizing thermally hardenable binder from 1 to 10 percent by weight, based on said dry mass of said cellulose material, of said binder hardenable by said electron radiation.

11. The process as defined in claim 7, wherein said form-stabilizing thermally hardenable binder is selected from the group consisting of phenol-formaldehyde resin, tannic resin, urea-formaldehyde resin, melamine-formaldehyde resin, and mixtures thereof.

12. The process as defined in claim 7, wherein said form-stabilizing thermally hardenable binder is an isocyanate resin.

13. The process as defined in claim 12, wherein said isocyanate resin is polymeric methyl diisocyanate.

14. The process as defined in claim 7, further comprising including in said mixture from 1 to 20 percent by weight, based on dry mass of said cellulose material, of a monomer for accelerating said hardening.

15. The process as defined in claim 14, wherein said monomer is included in said mixture an amount of from 1 to 5 percent by weight, based on said dry mass of said cellulose material, has at least one functional group and consists of an unsaturated vinyl monomer.

16. The process as defined in claim 7, wherein said binder hardenable by said electron radiation is contained in said mixture in an amount of from 1 to 30 percent by weight of said binder, based on dry mass of said cellulose material.

17. The process as defined in claim 7, wherein said binder hardenable by said electron radiation is a synthetic resin and said synthetic resin is selected from the group consisting of unsaturated polyester resins, ether acrylate resins, epoxide acrylate resins, urethane acrylate resins and unsaturated acrylate resins.

18. A process for manufacture of chipboard, fiberboard or oriented strand board from comminuted cellulose material, said process comprising the steps of:

a) mixing the comminuted cellulose material with a binder hardenable by means of electron radiation and with a peroxide to form a starting mixture;

b) then partially hardening the starting mixture under an external pressure and heating by means of a radical hardening process employing said peroxide to form a partially hardened molded body; and c) after the partially hardening, further hardening by means of electron radiation to form the chipboard, fiberboard or oriented strand board from said partially hardened molded body by means of the electron radiation.

19. The process as defined in claim 18, wherein said peroxide is an organic peroxide compound.

20. The process as defined in claim 18, wherein said binder hardenable by said electron radiation is contained in said starting mixture in an amount of from 1 to 30 percent by weight of said binder, based on dry mass of said cellulose material.

21. The process as defined in claim 18, wherein said binder hardenable by said electron radiation is a synthetic resin and said synthetic resin is selected from the group consisting of unsaturated polyester resins, ether acrylate resins, epoxide acrylate resins, urethane acrylate resins and unsaturated acrylate resins.

22. A process for manufacture of chipboard, fiberboard or oriented strand board from comminuted cellulose material, said process comprising the steps of:

a) mixing the comminuted cellulose material with a binder hardenable by electron radiation to form a mixture;

b) compressing said mixture to form a molded body having a thickness smaller than a final thickness of a final product of the process; and c) reducing pressure on the molded body so that the molded body attains the final thickness of the final product; and d) curing the binder by electron radiation.

23. The process as defined in claim 22, wherein said binder hardenable by said electron radiation is a synthetic resin and said synthetic resin is selected from the group consisting of unsaturated polyester resins, ether acrylate resins, epoxide acrylate resins, urethane acrylate resins and unsaturated acrylate resins.

24. The process as defined in claim 22, wherein said binder hardenable by said electron radiation is contained in said mixture in an amount of from 1 to 30 percent by weight of said binder, based on dry mass of said cellulose material.

25. The process as defined in claim 24, further comprising including in said mixture from 1 to 20 percent by weight, based on dry mass of said cellulose material, of a monomer for accelerating said hardening.

26. The process as defined in claim 25, wherein said monomer is included in said mixture an amount of from 1 to 5 percent by weight, based on said dry mass of said cellulose material, has at least one functional group and consists of an unsaturated vinyl monomer.

* * * * *